United States Patent [19]

Martin

[11] Patent Number: 5,123,363

[45] Date of Patent: Jun. 23, 1992

[54] METHOD AND APPARATUS FOR REDUCING THE NITRIC OXIDE CONCENTRATION IN THE WASTE GAS FLOW OF COMBUSTION PROCESSES

[75] Inventor: Johannes J. E. Martin, Seeshaupt, Fed. Rep. of Germany

[73] Assignee: Martin GmbH fur Umwelt-und Energietechnik, Munich, Fed. Rep. of Germany

[21] Appl. No.: 605,678

[22] Filed: Oct. 30, 1990

[30] Foreign Application Priority Data

Nov. 27, 1989 [DE] Fed. Rep. of Germany ....... 3939197

[51] Int. Cl.$^5$ .......................... F23J 11/00; F23J 15/00
[52] U.S. Cl. ...................................... 110/345; 110/344
[58] Field of Search ................ 110/343, 344, 345, 342

[56] References Cited

U.S. PATENT DOCUMENTS 4,779,545 10/1988 Breen et al. ...................... 110/345 X
4,940,010 7/1990 Kubin et al. ...................... 110/345 X

FOREIGN PATENT DOCUMENTS 3510669 9/1986 Fed. Rep. of Germany .
3716088 9/1986 Fed. Rep. of Germany .
3811636 3/1989 Fed. Rep. of Germany .
1416623 9/1965 France ................................. 110/345
0020380 2/1980 Japan ................................. 110/345

OTHER PUBLICATIONS

Emissionsminderung bei Müllverbrennungsanlagen durch Primärmassnahmen; by Von A. Christmann und K. Horch dated Apr. 19, 1987.

Primary Examiner—Edward G. Favors
Attorney, Agent, or Firm—McAulay Fisher Nissen Goldberg & Kiel

[57] ABSTRACT

The method for reducing the nitric oxide concentration in the waste gas flow of combustion processes consists of the introduction of chemicals, e.g. ammonia, sal ammoniac, urea, calcium cyanamide, into the waste gas flow, wherein the waste gas flow is marked by an additional compulsorily produced strong turbulence and the waste gas flow is compressed prior to this turbulence zone. The introduction of the treatment medium is effected shortly before the turbulence zone and the waste gas flow is relaxed and calmed subsequent to the turbulence zone. In order to implement this method, a furnace is provided which comprises a grate and a waste gas flue consisting of an ascending waste gas flue and a descending waste gas flue adjoining the latter. The current flow of the waste gas flow is substantially S-shaped proceeding from the furnace grate to the downwardly directed waste gas flue, wherein the change of direction in the lower area is substantially smoother than in the reversing space. In the upper portion the waste gas flue the waste gas flow is compressed by means of corresponding inclination and consequent constriction of the cross section of the waste gas flue. Spray nozzles are provided at the commencement of the upper portion of the ascending waste gas flue in order to introduce chemicals. The introduction of the chemicals is effected shortly before the compression and the production of strong turbulence.

10 Claims, 1 Drawing Sheet

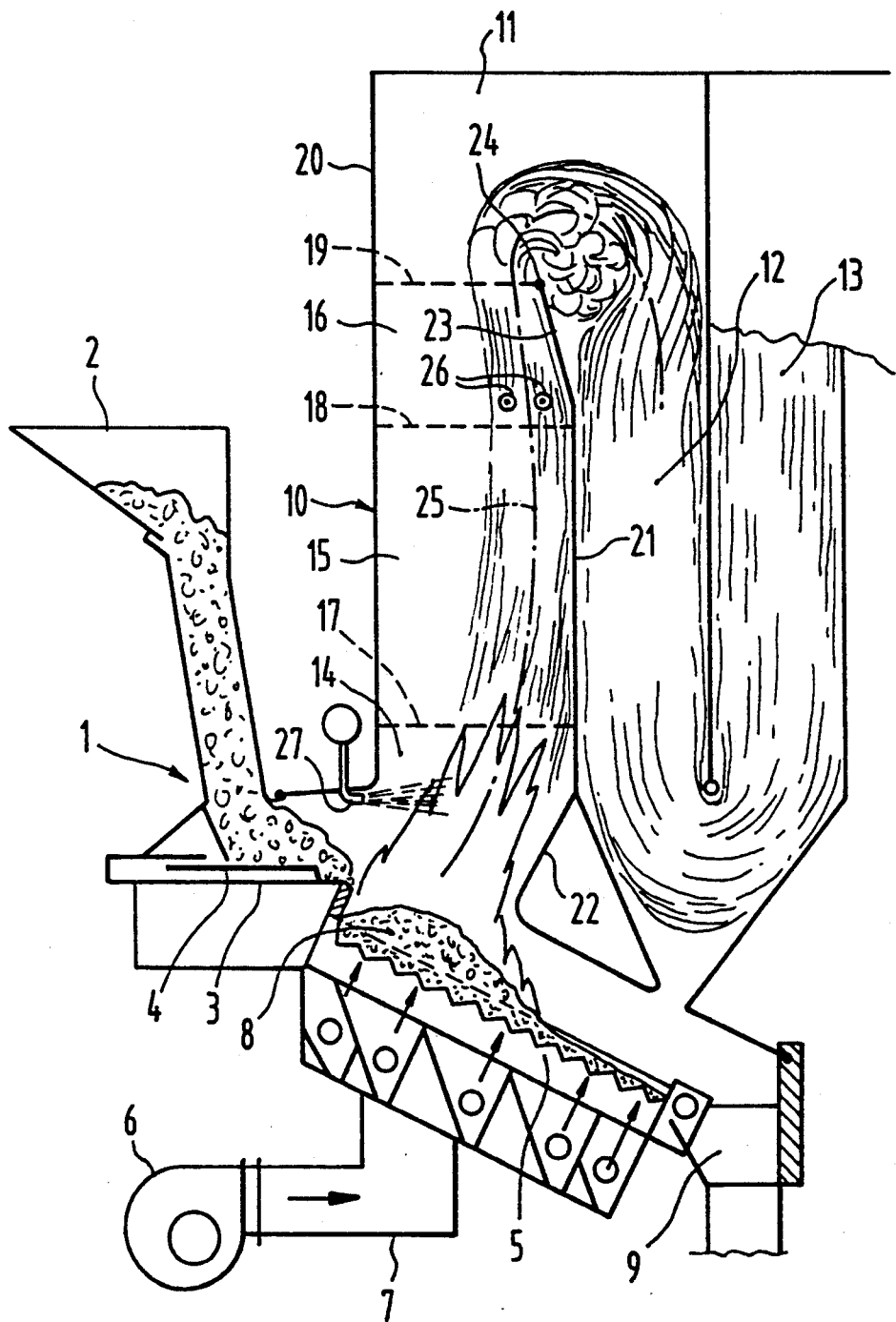

METHOD AND APPARATUS FOR REDUCING THE NITRIC OXIDE CONCENTRATION IN THE WASTE GAS FLOW OF COMBUSTION PROCESSES

BACKGROUND OF THE INVENTION

1. Field of the Invention

The invention is directed to a method for reducing the nitric oxide concentration in the waste gas flow of combustion processes in which a treatment medium is introduced into the waste gas flow and the waste gas flow is subjected to an additional compulsorily produced turbulence as well as to a compression and subsequent relaxation and calming. The invention is also directed to an apparatus for implementing the method.

2. Background Art

In order to reduce the nitric oxide concentration in the waste gas flow of combustion processes it is known to introduce various chemicals, e.g. ammonia, sal ammoniac, urea, calcium cyanamide, into the waste gas flow of a combustion system. The chief consideration in all these methods was previously given to the feed of chemicals in determined temperature ranges. In order to arrive at usable results the chemicals were introduced at a plurality of locations, wherein the composition and concentration of the chemical solutions or chemical suspensions were adapted to the temperature conditions prevailing in the different feed planes. In order to achieve a good distribution of the introduced chemicals, a large quantity of feed locations and feed nozzles had to be provided. These steps are not only costly with respect to construction, but also require a large expenditure on regulating technology.

In the method mentioned in the beginning, which is known from DE 36 10 669 A1, in order to improve the above-mentioned conditions, a rotational flow having a certain inner turbulence is first brought about in an inlet chamber, which is circular in cross section, by means of tangential admission of flue gases. A Venturi device is connected to this chamber, the flue gases being compressed and accelerated vertically upward in the confusor of the Venturi device. The treatment medium is introduced at the location of highest acceleration and compression which is formed by the throat of the Venturi device, whereupon the mixture is relaxed in the subsequent diffusor and is then directed into an ascending pipe shaft in which the actual reaction occurs. As a result of the compression and upward acceleration, the spiral flow is pulled apart, which leads to a uniform flow, so that the certain production of turbulence is no longer effective to the desired extent prior to the introduction of the medium. The compression zone is very short, so that no reaction occurs here which first takes place in the homogenized and calmed flow. This known treatment method takes place in an apparatus which is independent of the furnace, so that an additional construction expenditure is required specifically for the treatment of the flue gas.

OBJECT OF THE INVENTION

It is the object of invention the to reduce the expenditure on construction and control technology on the one hand and to further advance the reduction of the nitric oxide concentration on the other hand.

SUMMARY OF THE INVENTION

This object is met based on a method for reducing the nitric oxide concentration in the waste gas flow of combustion processes, in which a treatment medium is introduced into the waste gas flow and the waste gas flow is subjected to an additional compulsorily produced turbulence as well as to a compression and subsequent relation and calming. The waste gas flow is first compressed and the treatment medium is introduced into the waste gas flow immediately prior to the compression. The production of the highest turbulence is first produced after the compression of the waste gas flow, which is already charged with treatment medium, simultaneously with the commencement of the relation.

In the present invention, in contrast to the known method which has just been described in the preceding, the treatment medium is introduced into the waste gas flow prior to the compression and prior to the production of turbulence. In comparison, in the known method, a moderate turbulence was first produced which was then eliminated again to a great extent, wherein the treatment medium was introduced into a very short compression zone, so that the reaction first occurred in the calmed waste gas flow. The reduction of the nitric oxide concentration is increased as a result of an improved reaction by means of the steps according to the invention. On the one hand, the fact that the treatment medium is introduced into the waste gas flow prior to the compression contributes to this. The compression of the waste gas flow results in a higher density of the molecules to be influenced by means of the chemicals with respect to the gas volume, so that there is a greater probability that the introduced chemicals will act on the molecules to be influenced. The reaction between the treatment medium and the waste gas flow already takes place in this area and is then further increased with a substantial increase in turbulence by means of the relaxation which takes place; since the production of a strong turbulence in the waste gas flow does not require any particularly large expenditure on construction, as will be explained in more detail in the following, the number of feed locations and feed nozzles and the cost of the latter, which was discussed in the beginning, can be reduced on the basis of the invention.

In a further development of the invention, the waste gas flow can be subjected to a transverse acceleration during the compression in order to increase the contact between the treatment medium and the flue gas in the area of the compression, so that an intensive mixing of both media can accordingly take place.

The compression of the waste gas flow is advantageously achieved in a particularly simple manner by means of constricting or narrowing the waste gas flow.

A particularly advantageous step for achieving a high turbulence consists, according to the invention, in that the turbulence is brought about by means of two changes of direction of the entire waste gas flow proceeding from the zone of origin to the relaxation zone, in that the compression of the waste gas flow is effected prior to the second change in direction, and in that the introduction of the treatment medium is effected prior to the second change in direction. Since directional changes of the waste gas flow can be achieved in a simple manner by means of a corresponding design of the furnace and waste gas flue, the cost for achieving a particularly strong turbulence is extremely low.

However, it is also possible to produce the turbulence by means of introducing an added gas into the waste gas flow.

Further, it is possible, using simple means, to produce the turbulence by means of baffles within the flow path.

If the treatment medium is introduced in aqueous solution by means of a single-component nozzle in a further development of the invention, the expenditure on energy for the introduction of the treatment medium is accordingly reduced compared with the introduction of the treatment medium by means of two-component nozzles, since no additional carrier or atomization medium requiring a corresponding energy cost for its preparation is necessary.

In order to increase the possibility for the treatment medium to act on the molecules to be reduced, it is advantageous if the treatment medium is introduced into the waste gas flow in drops of such a magnitude as to enable an explosion-like evaporation of the solvent or carrier medium.

An apparatus, i.e. a furnace for implementing the method, comprising an upwardly directed waste gas flue arranged above a furnace grate with combustible material feed and slag discharge, a reversing space for the waste gas flow, and a downwardly directed waste gas flue is characterized, according to the invention, in that the ascending waste gas flue is divided into three portions in which the defining wall in the first portion facing the slag discharge is inclined in the direction of the slag discharge proceeding from the vertical line, is constructed in the second portion substantially vertically, and is inclined in the third portion proceeding from the vertical line in the direction of the combustible material feed, and in that the cross section of the first portion is somewhat widened in the direction of the second portion, and the cross section of the third portion is sharply narrowed relative to the cross section of the second portion, and in that spray nozzles are arranged in the lower area of the third portion for the introduction of a treatment medium.

A substantially S-shaped current flow of the waste gas flow proceeding from the furnace grate to the downwardly directed waste gas flue is achieved by means of this simple constructional step, wherein the change in direction in the lower area of the waste gas flue is much less strong than in the reversing space. A strong turbulence and an intensive mixing of the waste gas flow and accordingly the advantageous prior conditions for the action of the chemicals on the nitric oxide are provided by means of the reversal of direction in connection with the sharp narrowing of third portion of the waste gas flue.

When the front wall, i.e. the wall of the waste gas flue facing the combustible material feed, is constructed vertically for the purpose of simplifying the construction, it is advisable in a further construction of the invention to provide at least one blow-in opening for secondary air at the commencement of the first portion of the waste gas flue at the defining wall facing the combustible material feed, so that the substantially S-shaped current flow of the waste gas flow is reinforced.

The invention is explained in more detail in the following with the aid of an embodiment example of a furnace shown in the accompanying drawing.

BRIEF DESCRIPTION OF THE DRAWING

In the drawing, a section through the furnace of the present invention is shown in schematic representation.

DESCRIPTION OF THE PREFERRED EMBODIMENTS

As can be seen from the drawing, which shows a section through a furnace in a highly schematic form, the latter comprises a combustible material feed, designated in its entirety by 1, which comprises a feed hopper 2, a feed table 3 and reciprocating charging pistons 4 on the latter. The combustible material, e.g. garbage, is fed by means of the charging pistons 4 to a furnace grate 5 which is supplied from below with combustion air which is fed to the grate, via a feed line 7, by means of a fan 6.

The combustion of the combustible material, designated by 8, is effected on the grate 5, wherein the combustion zone, which is simultaneously the zone of origin of the nitric oxide to be reduced, extends over approximately half the length of the grate. The remaining portion of the furnace grate serves to cool the slag which falls into a slag discharge 9 at the end of the furnace grate.

The furnace grate 5 is inclined in the direction of the slag discharge 9 proceeding from the combustible material feed 1 and is preferably constructed as a reciprocating grate.

A waste gas flue, which is designated in its entirety by 10, extends upward over the combustion zone of the furnace grate 5 and opens into a reversing chamber 11, a downwardly directed waste gas flue 12 being connected to the latter. An upwardly directed waste gas flue 13 is in turn connected to this waste gas flue 12, wherein the coarsest dust particles are discharged downward onto the grate due to the strong deflection.

The first ascending waste gas flue 10 which, in its lower area, receives flames occurring during the combustion simultaneously serves as a furnace and is divided substantially into three portions 14, 15 and 16 which are defined by the lines 17, 18 and 19. The defining wall of the waste gas flue facing the combustible material feed i is designated by 20 and the rear defining wall facing the slag discharge 9 is designated by 21.

The rear defining wall of the waste gas flue, which is designated in its entirety by 21, is inclined, proceeding from the vertical line, in the direction of the slag discharge 9 in the first portion 14 of the waste gas flue, in which it is designated by 22, so that a widening of the cross section of the first portion 14 results in the direction of the second portion 15. The second portion 15 is substantially defined by parallel walls, while the rear wall of the third portion 16, designated by 23, is inclined relatively sharply from the vertical line in the direction of the combustible material feed 1, so that an increasingly pronounced narrowing of the cross section of the third portion 16 results. The cross section of the third portion 16 is substantially narrowed relative to the cross section of the portion 15. Accordingly, there is strong compression of the waste gas flow. The end of the rear defining wall 23 projects into the reversing space 11. In so doing, the waste gas flow is deflected in the sharp bend around the edge 24 of the defining wall 23 and enters into the downwardly directed waste gas flue 12. Since the rear defining wall 23 is simultaneously also the defining wall for the downwardly directed waste gas flue 12, the latter is wider in its upper portion than in its lower portion, wherein the upper area of the waste gas flue 12 is substantially larger in cross section than the upper area of the third portion 16 of the upwardly directed waste gas flue. Accordingly, a relaxation and calming of the waste gas flow occurs after flowing around the edge 24.

Due to the described construction design, a substantially S-shaped current flow of the waste gas flow results proceeding from the combustion grate to the downwardly directed waste gas flue 12, wherein the current flow is indicated schematically by the dash-dot line 25. Because of this S-shaped flow, the waste gas flow is subjected to two changes of direction, wherein the first change of direction is effected in the transition from the first portion 14 to the second portion 15, while the second change in direction is already initiated in the third portion 16 and is then continued in the sharp bend in the reversing space 11. The current flow is thus subjected to a slighter change in direction in the lower area than in the upper area.

Spray nozzles 26 are arranged in the lower area of the third portion 16 in which the compression of the waste gas flow begins due to the inclined defining wall 23, the chemicals, which are in aqueous solution or suspension, being sprayed into the waste gas flue in finely distributed form by means of the spray nozzles 26, wherein the spray nozzles are preferably constructed as single-component nozzles. The atomization of the aqueous chemical solution or suspension effected by means of the nozzles leads to an explosion-like evaporation of the water, so that the introduced chemicals are present in solid form in the flue gas immediately after being sprayed in. As already mentioned in the beginning, ammonia, sal ammoniac, urea or calcium cyanamide can be sprayed in in aqueous solution or suspension in order to bring about the reduction of the nitric oxide. Due to the change in direction initiated in the third portion 16 in connection with the strong compression of the waste gas flow and the very sharp change in direction around the edge 24, the waste gas flow is marked by a particularly strong turbulence in which the conditions for the reduction of the nitric oxide are particularly good, wherein, as a result of the compression in the portion 16, the density of the molecules to be influenced is greater with respect to the gas volume than in the rest of the waste gas flow, which likewise leads to the improvement of the conditions for the reduction of the nitric oxide. Due to the arc-shaped flow of the current path 25 in the portion 15, the gas molecules are accelerated in the direction of the defining wall 23, which, in connection with the direction reversal brought about by the defining wall 23, leads to an acceleration of the gas particles in the opposite direction, so that an intensive mixing of the gas molecules of the introduced chemicals is brought about. The compression of the gas flow and the production of a particularly strong turbulence then lead to an even greater reduction of the nitric oxide content in the waste gas flow than was possible in the previous conventional methods.

In order to direct the waste gas flow in the desired direction directly over the furnace grate 5, ie. in the direction of the defining wall 21, a blow-out nozzle 27 for secondary air is provided at the lower end of the front defining wall 20. The defining wall 20 can accordingly be constructed as a simple vertical defining wall.

When the foregoing description and drawings represent the preferred embodiments of the present invention, it will be obvious to those skilled in the art that various changes and modifications may be made therein without departing from the true spirit and scope of the present invention.

What is claimed is:

1. In a method for reducing the nitric oxide concentration in the waste gas flow of combustion processes, in which a treatment medium is introduced into the waste gas flow and the waste gas flow is subjected to an additional compulsorily produced turbulence as well as to a compression and subsequence relaxation and calming, the improvement comprising the steps of: first compressing the waste gas flow, introducing the treatment medium into the waste gas flow immediately prior to the compression step, and first producing production of the highest turbulence after the compression of the waste gas flow, which is already charged with treatment medium simultaneously with the commencement of the relaxation.

2. The method according to claim 1, wherein the waste gas flow is subjected to a transverse acceleration during the compression.

3. The method according to claim 1 wherein the compression of the waste gas flow is achieved by means of constriction or narrowing.

4. The method according to claim 1 wherein the turbulence is brought about by means of two changes in direction of the entire waste gas flow proceeding from the zone of origin until the relaxation zone, and wherein the compression of the waste gas flow is effected prior to the second change in direction, and wherein the introduction of the treatment medium is carried out prior to the second change in direction.

5. The method according to claim 1, wherein the turbulence is produced by means of the introduction of an added gas to the waste gas flow.

6. The method according to claim 1, wherein the turbulence is produced by means of baffles within the current path of the waste gas flow.

7. The method according to claim 1, wherein the treatment medium is introduced in aqueous solution by means of a single-component nozzle.

8. The method according to claim 1, wherein the treatment medium is introduced into the waste gas flow in drops of such a magnitude as to enable an explosion-like evaporation of the solvent or carrier medium.

9. In an apparatus for reducing the nitric oxide concentration in the waste gas flow of combustion processes, having directed waste gas flow arranged above a furnace grate with combustible material feed and slag discharge, a reversing space for the waste gas flow, and a downwardly directed waste gas flue, the improvement comprising that the ascending waste gas flue is divided into three portions in which a defining wall in the first portion facing the slag discharge is inclined in the direction of the slag discharge proceeding from a vertical line, is constructed vertically in the second portion, and is inclined in the third portion, proceeding from the vertical line, toward the combustible material feed, in that the cross section of the first portion is somewhat widened in the direction of the second portion and the cross section of the third portion is sharply narrowed relative tot eh cross section of the second portion, and in that spray nozzles are arranged in the lower area of the third portion for introducing a treatment medium.

10. Apparatus according to claim 9, wherein at least one blow-in opening for secondary air is provided at the commencement of the first portion of the waste gas flue at the defining wall facing the combustible material feed.

* * * * *